Sept. 20, 1955  H. GERNSBACK  2,718,083
HYDRAULIC FISHERY
Filed July 10, 1953  2 Sheets—Sheet 1
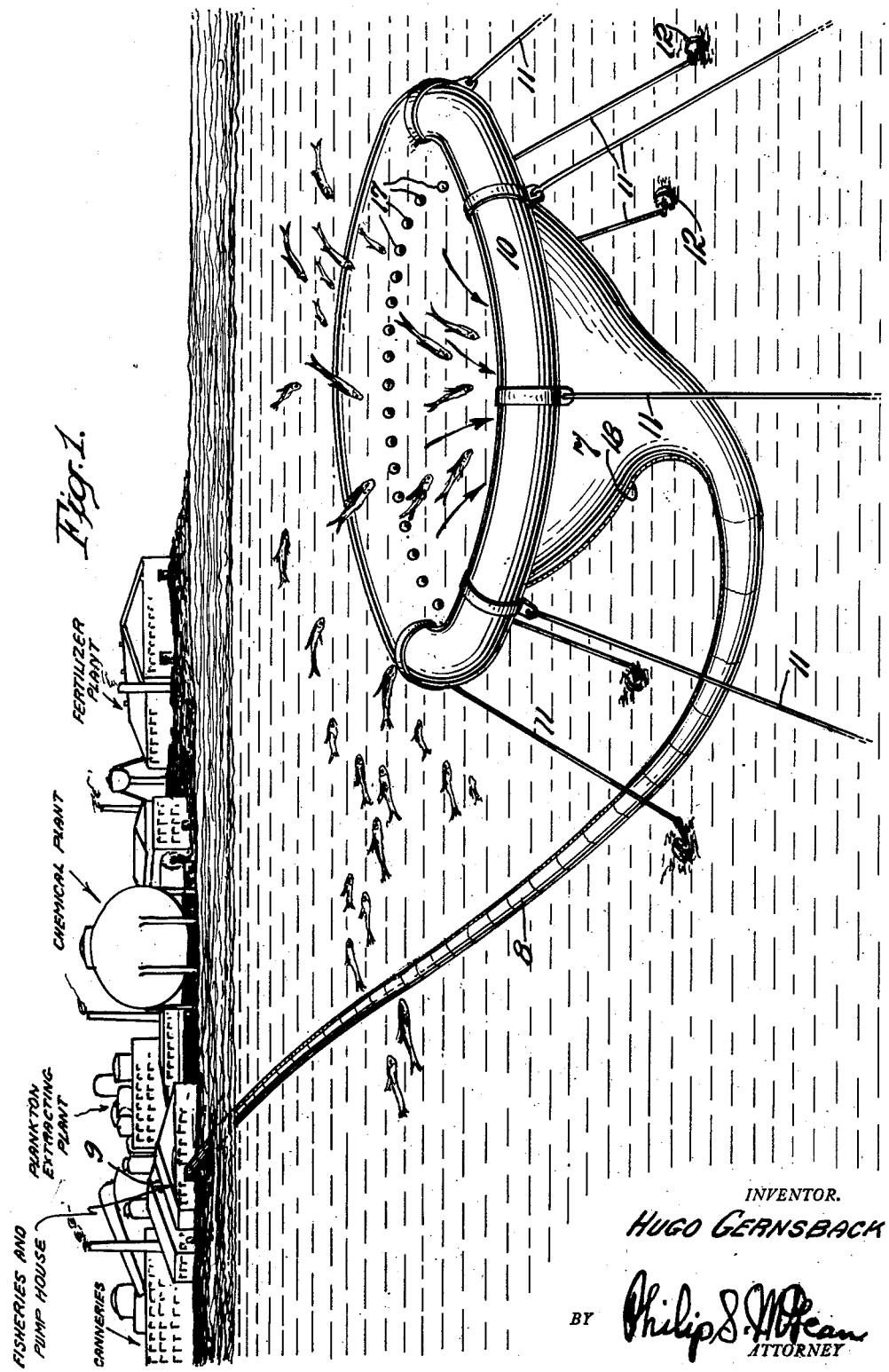
INVENTOR.
HUGO GERNSBACK
BY
ATTORNEY Sept. 20, 1955
H. GERNSBACK
2,718,083
HYDRAULIC FISHERY
Filed July 10, 1953
2 Sheets-Sheet 2
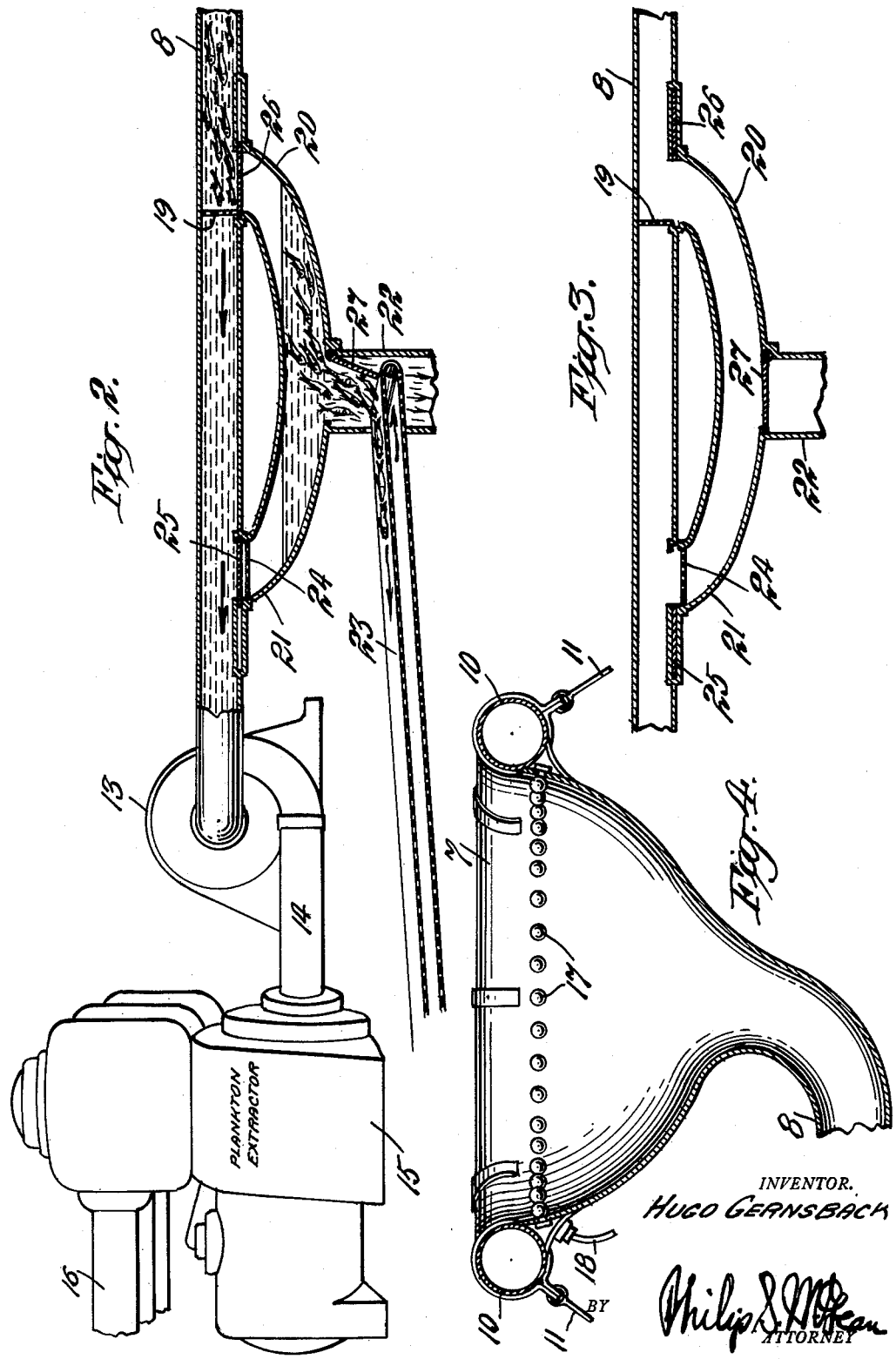
INVENTOR.
HUGO GERNSBACK
BY
ATTORNEY

United States Patent Office 2,718,083
Patented Sept. 20, 1955

2,718,083

HYDRAULIC FISHERY

Hugo Gernsback, New York, N. Y.

Application July 10, 1953, Serial No. 367,158

5 Claims. (Cl. 43—4)

The invention disclosed in this patent application is a system for catching fish, based on hydraulic principles and utilizing flow of water to entrap and to transport the fish.

Basically the invention involves the provision of a funnel shaped collector submerged in fish-containing waters, possibly miles from shore, and connected by a fish-conveying water pipeline to suction pumps based on shore and operating to create an inflow into the mouth of the funnel and flow of water and entrapped fish through the pipeline to a suitable fish-processing station on shore, and to vegetable and chemical extracting plants for removing other valuable materials from the water.

Objects of the invention are to provide a commercially practical and efficient system of the character outlined which can be installed and operated at low cost and which will not interfere with shipping or other activities in the water from which the extraction is effected.

Other desirable objects and the novel features through which the purposes of the invention are attained will appear and are set forth in greater detail in the specification following.

The drawings accompanying and forming part of the specification are illustrative of a present practical embodiment of the invention.

Structure and arrangement, however, may be modified and changed as regards the immediate illustration, all within the true intent and broad scope of the invention as hereinafter defined and claimed.

Fig. 1 in the drawings is a diagrammatic and perspective view illustrating an offshore installation of the invention.

Fig. 2 is a broken sectional view illustrating portions of the separating, pumping and extracting apparatus located on shore.

Fig. 3 is a broken sectional detail of the separating or screening apparatus.

Fig. 4 is a broken sectional detail of the intake funnel.

In Fig. 1 the system is shown as comprising a large intake funnel 7, possibly of stainless steel or the like, secured in submerged relation in a body of fish-inhabited water and having a pipeline 8 of adequate size extending from the lower smaller end of the same to a pump house 9 located on shore.

The funnel is shown as having a circular float or tank 10 about the rim of the same, anchored at a level below water travel and, if possible, at a level known to carry schools of fish.

The anchorage means is shown as comprising guy wires or cables 11 attached to the float or rim of the funnel and connected with suitable anchors 12.

Fig. 2 illustrates equipment in the pump house, comprising a pump 13 of large capacity connected at the intake side with the inner end of the pipeline and having the discharge side of the same connected at 14 with an extractor 15 for vegetable plankton or the like, the latter having discharge connections 16 to chemical plants for extracting minerals and the like from the water.

Fish canneries, plankton extraction, chemical and fertilizer plants may be conveniently located adjacent to the pump house, as indicated in Fig. 1, so that all valuable materials taken from the water can be immediately and economically processed.

At the intake end of the system, lights, mirrors and other forms of fish attractors may be provided, such as the lamps indicated at 17, about the mouth of the funnel, energized and controlled by electric cable 18 extending from the shore and carried by the pipeline. These lights may be variously colored and may be flashed or kept on continuously, according to best results obtained.

The pump or pumps may be of the bladeless, impeller type, to pass fish and other extracted matter but screening and diversion means are preferably provided as indicated in Figs. 2 and 3 comprising a fish screen 19 in the pipeline ahead of the pump and a bypass 20 led off from the pipeline in front of the screen.

This bypass is shown as extended back into the pipeline at 21 at the pump side of screen 19 and as having a dump or discharge 22 at the center directed on to a fish conveyor 23.

The return end of the bypass at 21 is shown screened at 24 to prevent return of fish into the pipeline at the pump and this return passage is shown as governed by a sliding door 25 which, in one position Fig. 2, closes the return and in the other position, Fig. 3, leaves the return open to the pump.

The entry end to the bypass is shown as controllable by a sliding door 26 which in one position, Fig. 2, closes the bypass and, in the other position, Fig. 3, leaves the bypass open to the pipeline 8.

Gates 25 and 26 are operated by suitable conventional handle means, not shown.

The fish discharge connection 22 is shown as having a swing door 27 at the entrance to the same which may be left open as in Fig. 2 to discharge the fish on to the conveyor, or closed as in Fig. 3 to shut off discharge flow.

By control of the lights or other lures at the intake funnel, and the pumps, gates or doors and other means at the pump house, the system may be operated continuously, intermittently, and in other ways, to get the best results.

While intended as a stationary installation, the intake funnel may be secured in a manner permitting or causing it to be adjusted to rising and falling tides and other changing conditions, and while considered generally preferable to float the funnel in the horizontal submerged relation indicated, it is contemplated that it may be inclined one way or another to catch a flowing tide or stream, and that fish directing guides and other means may be employed for assuring or increasing the catch.

The bypass 20 connected at opposite ends with the pipeline 8 and the provision of the discharge outlet 22 in this bypass, with regulatable door or closure 27, enables the system to be operated in various ways to meet varying conditions.

In the example illustrated in Fig. 2 the inlet to bypass 20 is shown cut off from the pipeline by the sliding valve form of closure 26 and the trap-door 27 is lowered to discharge a load of fish previously diverted from the pipeline and collected in the bypass onto conveyor 25 carrying the fish off to storage or preserving equipment, water used in this diversionary discharge operation being run to waste or storage.

While one batch is taken off for processing, another batch of fish may be accumulating in front of screen 19, as indicated in Fig. 2, ready to be run off through the branch or bypass 20 as soon as the first batch has been disposed of.

If continuous rather than intermittent or batch operation is desired, the inlet and outlet doors 26 and 25 may be left open, as in Fig. 3, so that fish will be continuously diverted into the bypass and there the door 27 may be left open or opened as required to dump the catch onto the take-off conveyor.

What is claimed is:

1. An hydraulic fishing system comprising a large fish-collecting funnel; means for floating same in submerged relation in a fish-containing body of water; a pipeline extending from said funnel to shore; a large capacity hydraulic pump connected with the shore end of said pipeline; and fish screening and extracting means at the shore end of said pipeline in advance of said pump, including a fish screen in said pipeline and a bypass around said screen connected with the pipeline at opposite sides of screen and having a fish discharge outlet at an intermediate section of the same.

2. An hydraulic fishing system comprising a large fish-collecting funnel; means for floating same in submerged relation in a fish-containing body of water; a pipeline extending from said funnel to shore; a large capacity hydraulic pump connected with the shore end of said pipeline; and fish screening and extracting means at the shore end of said pipeline in advance of said pump, including a fish screen in said pipeline and a bypass around said screen connected with the pipeline at opposite sides of screen and having a fish discharge outlet at an intermediate section of same and controllable closure means for the opposite ends of said bypass and for said fish discharge outlet.

3. An hydraulic fishing system comprising a large fish-collecting funnel; means for floating same in submerged relation in a fish-containing body of water; a pipeline extending from said funnel to shore; a large capacity hydraulic pump connected with the shore end of said pipeline; and fish screening and extracting means at the shore end of said pipeline in advance of said pump, including a fish screen in said pipeline and a bypass around said screen connected with the pipeline at opposite sides of said screen and having a discharge outlet at an intermediate section of the same, a fish conveyor extending away from said fish discharge outlet, and closure means at the entrance to said outlet for controlling flow thereinto.

4. An hydraulic fishing system comprising a large fish collecting funnel, means for supporting said funnel submerged in a body of fish-containing water, a fish transporting pipeline extending from said funnel to shore, a suction pump connected with the shore end of said pipeline, a fish screen in said pipeline, a bypass extending from said pipeline about said screen and back into said pipeline, a second fish screen at the return end of said bypass, said bypass having a fish discharging outlet, a trap-door controlling said fish discharging outlet and independently regulatable closure means at the opposite ends of said bypass for closing off or opening up one or both ends of said bypass in respect to said pipeline.

5. An hydraulic system comprising a fish collecting funnel, means for supporting said funnel submerged in fish-containing water, a fish transporting pipeline extending from said funnel to shore, a suction pump connected at its suction side with the shore end of said pipeline, a plankton extractor connected with the discharge side of said suction pump, a fish screen in said pipeline ahead of the inlet to said suction pump, a bypass connected with said pipeline ahead of the screen and means for diverting fish from the pipeline in front of the screen into said bypass and whereby said plankton extractor will be supplied from the suction pump independently of fish removal from the pipeline.

References Cited in the file of this patent

UNITED STATES PATENTS

| 546,606 | Brainerd | Sept. 17, 1895 |
| 2,163,282 | Hovden | June 20, 1939 |
| 2,396,305 | Toft | Mar. 12, 1946 |

FOREIGN PATENTS

| 997,247 | France | Jan. 3, 1952 |